J. KENKEL.
POT AND LID LIFTER.
APPLICATION FILED MAR. 7, 1918.
1,277,946.
Patented Sept. 3, 1918.
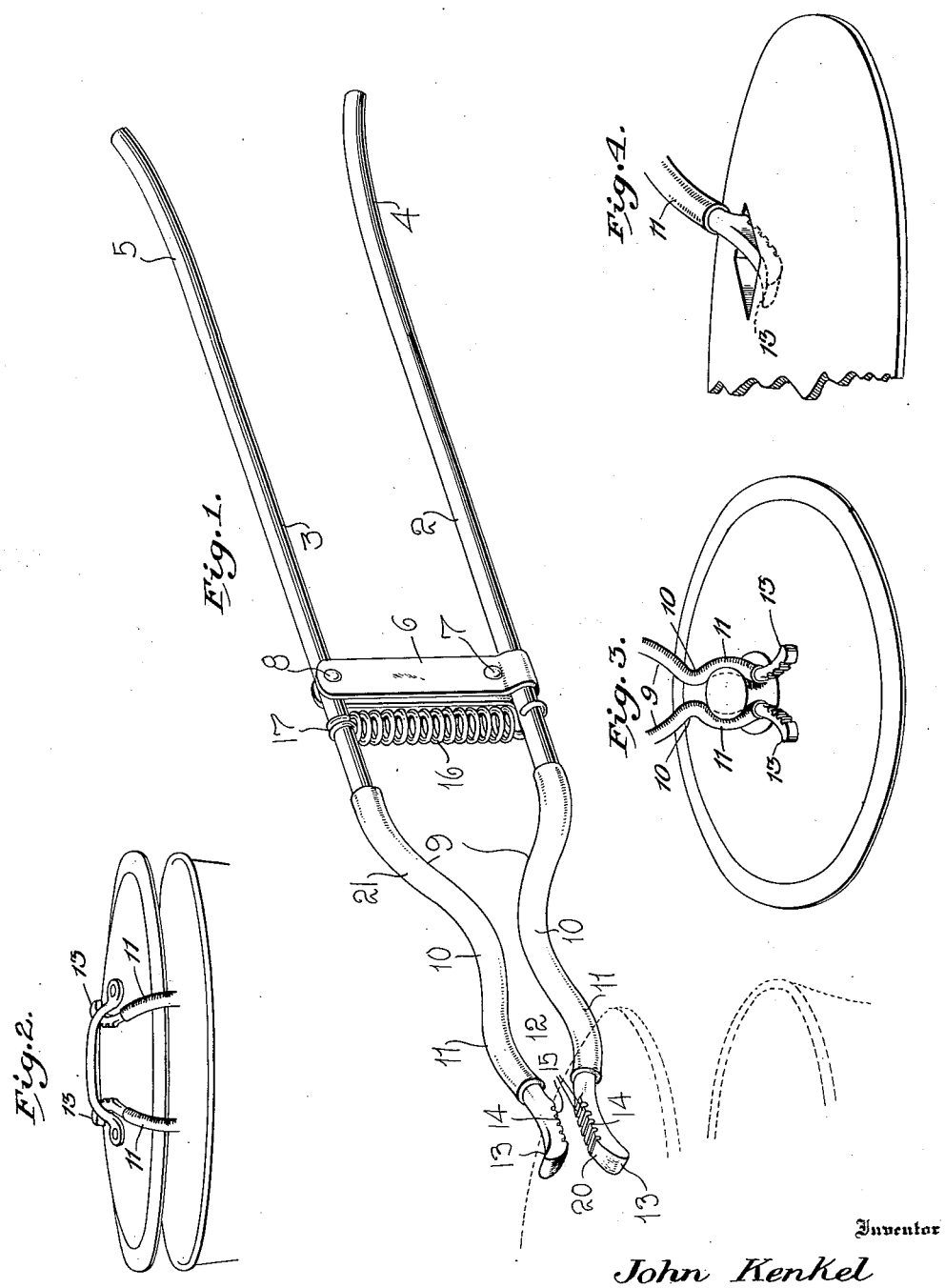
Inventor
John Kenkel
By Charles E. Lane
Attorney

UNITED STATES PATENT OFFICE.

JOHN KENKEL, OF CHEYENNE, WYOMING.

POT AND LID LIFTER.

1,277,946.  Specification of Letters Patent.  Patented Sept. 3, 1918.

Application filed March 7, 1918. Serial No. 221,021.

*To all whom it may concern:*

Be it known that I, JOHN KENKEL, a citizen of the United States, residing at Cheyenne, in the county of Laramie and State of Wyoming, have invented new and useful Improvements in Pot and Lid Lifters, of which the following is a specification.

This invention relates to devices for facilitating the lifting and carrying of hot pans or kettles and the like, and particularly to facilitate the removal of covers and tops of various types of pans, kettles or kitchen utensils, the object of the invention being to provide an extremely simple, inexpensive, practicable and durable device of this type, whereby covers, tops or the like and various types of containers and cooking utensils may be conveniently removed while hot without liability of scalding or injuring the user.

With these and other objects in view as will be rendered manifest in the following specification, the invention consists of a pot or utensil and cover lifter comprising the construction, the combination and details as described more particularly hereinafter in reference to an embodiment of the invention illustrated in the accompanying drawing in which—

Figure 1 is a perspective view of the device shown in its application to the cover to be removed; Fig. 2 is a perspective view showing the use of the device to engage a rigid bail or a cover; Fig. 3 shows the device applied to a knob; and Fig. 4 shows it as a stove lifter.

The implement comprises a pair of lever members 2 and 3, preferably in the form of round wire, having slightly outwardly curved handle portions 4 and 5 to one of which there is secured rigidly a substantially U-shaped fulcrum member 6 bent around one of the shanks 2 and firmly clamped thereon by means of a rivet 7 driven through the parallel bars of the clip 6 in a position close to the surface of the shank 2 embraced. The upper and open ends of the clip 6 straddle the opposite and fulcrumed lever 3, these parts being pivotally connected by a rivet or the like 8 which is driven through the ends of the clip and through the body of the lever 3, the latter being provided thereby for rocking movement on the upper end of the clip 6.

The operative ends of the lifter are shown as comprising convergently curved portions 9 which are again outwardly curved at opposite points 10 beyond which there are formed small bows 11 forming an elliptical eye 12 beyond which ends 13—13 are provided with relatively flat surfaces 14 which may, if desired, be serrated as at 15 to increase the friction of the gripping jaws thus formed when the grippers are closed together through the action of a contractile spring 16, the ends of which are provided with hooks 17 embracing the rods or levers 2 and 3, the spring being shown as disposed closely adjacent to the fulcrum clip 6. The extreme outer ends of the gripping jaws 13 are beveled outwardly as at 20 to facilitate the guiding of the device when the jaws are sprung open by pressure on the handles 4—5.

The curved portions 10—10 of the bars may be covered with sections of rubber tubing as illustrated at 21 to form a cushion to prevent the marring or scarring of the pieces to be clamped by the lifter.

What I claim is:

An implement for handling heated lids, covers, pans, etc., comprising a pair of members with substantially straight handle portions spaced with their axes in a common plane, a spacing element upon which one of the members is pivoted, each member bent in a quarter turn beyond the fulcrum to a meeting plane, then bowed so as to form an eye between the meeting bows, and the end beyond the bow deflected from the meeting plane, and means for contracting the gripping ends.

In testimony whereof I affix my signature.

JOHN KENKEL.